United States Patent [19]

Angell et al.

[11] Patent Number: 5,482,528
[45] Date of Patent: Jan. 9, 1996

[54] PATHOGENIC WASTE TREATMENT

[75] Inventors: Edwin C. Angell; Jess Karr, both of Bakersfield, Calif.

[73] Assignee: Hondo Chemical, Inc., Bakersfield, Calif.

[21] Appl. No.: 339,805

[22] Filed: Nov. 15, 1994

Related U.S. Application Data

[62] Division of Ser. No. 922,329, Jul. 30, 1992, Pat. No. 5,422,015.

[51] Int. Cl.$^6$ ............................. C02F 11/14; C05F 3/00
[52] U.S. Cl. ........................ 71/12; 71/21; 71/901; 210/751; 210/764; 106/708; 588/257
[58] Field of Search ................................ 71/11–13, 21, 71/25, 26, 901; 588/257, 258; 106/708, 778, 795, 802; 210/609, 751, 764, 766

[56] References Cited

U.S. PATENT DOCUMENTS

| | | | |
|---|---|---|---|
| 4,191,549 | 3/1980 | Boyko | 71/13 |
| 4,547,290 | 10/1985 | Pichat | 210/751 |
| 4,554,002 | 11/1985 | Nicholson | 71/12 |
| 4,615,809 | 10/1986 | King | 210/751 |
| 4,781,842 | 11/1988 | Nicholson | 210/751 |
| 4,793,927 | 12/1988 | Meehan et al. | 210/751 |
| 4,902,431 | 2/1990 | Nicholson et al. | 210/751 |
| 4,997,486 | 3/1991 | Bolsing | 106/778 |
| 5,051,031 | 9/1991 | Schumacher et al. | 210/751 |
| 5,221,312 | 6/1993 | Buhidar | 71/12 |
| 5,246,596 | 9/1993 | Baldwin, Jr. et al. | 210/751 |

*Primary Examiner*—Thomas Wyse
*Attorney, Agent, or Firm*—Marvin E. Jacobs

[57] ABSTRACT

Solid waste such as sewage sludge containing fecal matter is processed to reduce pathogens by at least 90% and converted to a useful product such as an amendment to agricultural land by combining the waste with an acid such as concentrated sulfuric and a base such as fly ash which exothermically react and thermally pasteurize the waste and add mineral value to the product. Pozzolanic materials, such as fly ash agglomerate the product and after grinding, the particles can aerate soil. The calcium oxide in fly ash reacts with sulfuric acid to form calcium sulfate dihydrate, a soil amendment. The amount of sulfuric acid can be controlled to provide a product with acid pH which is useful to neutralize alkaline soils such as those found in the Western United States of America.

8 Claims, 4 Drawing Sheets

CALCIUM ACETATE GENERATION:

$$2CH_3CO_2H + CaO \longrightarrow Ca(CH_3CO_2^-)_2 + H_2O \qquad Eq(1)$$
Calcium Acetic Acid    Calcium Oxide            Calcium Acetate $$2CH_3CO_2H + Ca(OH)_2 \longrightarrow Ca(CH_3CO_2^-)_2 + 2H_2O \qquad Eq(2)$$
$\qquad\qquad$ Calcium Hydroxide

FURNACE CHAMBER REACTIONS:

$$Ca(CH_3CO_2^-)_2 \xrightarrow[>160°C]{\Delta} CaCO_3 + CH_3COCH_3 \qquad Eq(3)$$
$\qquad\qquad\qquad$ Calcium Carbonate $\quad$ Acetone
$\qquad\qquad\qquad$ (Limestone)

$$CH_3COCH_3 + 3O_2 \xrightarrow{\Delta} 3CO_2 + 3H_2O + \Delta \qquad Eq(4)$$
$\qquad\qquad\qquad\qquad\qquad\qquad$ Heat $$CaCO_3 \xrightarrow[>825°C]{Calcination} CaO + CO_2\uparrow \qquad Eq(5)$$
$\qquad\qquad\qquad$ Calcium Oxide
$\qquad\qquad\qquad$ (Lime)

$$CaO + SO_2 \longrightarrow CaSO_3 \qquad Eq(6)$$
$\qquad\qquad\qquad$ Calcium Sulfite and/or $$CaO + SO_2 + \tfrac{1}{2}O_2 \longrightarrow CaSO_4 \qquad Eq(7)$$
$\qquad\qquad\qquad\qquad$ Calcium Sulfate

FIG. 5

PATHOGENIC WASTE TREATMENT

This is a Division of application Ser. No. 07/922,329, filed Jul. 30, 1992, now U.S. Pat. No. 5,422,015.

TECHNICAL FIELD

The present invention relates to treatment of pathogen containing solid waste such as sewage sludge to reduce the pathogens to a safe level and convert the sludge to a useful product. More particularly, this invention relates to combining sludge or other solid waste with heat generating treatment chemicals that pasteurize the waste and convert it to a soil amendment or fertilizer.

BACKGROUND OF THE INVENTION

Ever increasing population results in a continuously increasing amount of solid waste. It also places stress on water supplies since potable water is used to flush much of human solid waste to treatment plants and sometimes directly to bodies of water used for human consumption. Pollution control authorities such as the Environmental Protection Agency, require that sewage be treated in several stages before being released into lakes, rivers, or the ocean. In 1985, Public Operated Treatment Works (POTW) were required to upgrade water treatment facilities to include secondary treatment for plants with ocean discharge and tertiary treatment for other plants. The end result of these regulations is improved water quality and increased volumes of sewage sludge. Sewage is now disposed of in land fills, surface sites, incineration or application to land. Land fill and surface sites are rapidly filling. Incineration requires the use of expensive fuel and contributes to air pollution. A natural use for sewage sludge and other solid, animal waste products such as residuals of waste water treatment, septages and animal manure would appear to be application to land in agricultural production due to the organic and mineral components of the waste.

However, feces containing solid waste tends to have a high pathogen content. If the sludge is not treated to reduce the pathogen content, land receiving application of the waste can not be used for animal grazing or food crop production for 5 years after the last application of solid waste. Furthermore, solid waste may contain heavy metal ions which may be hazardous to animals or could accumulate in the soil and render it unsuitable for agriculture.

Regulations have been promulgated by the Environmental Protection Agency establishing criteria and conditions for the reuse of these materials. Use limitation criteria are based on deleterious constituents such as heavy metal and pathogenic organisms. Concurrent with reuse guideline development has been the reduction in the number of disposal sites willing and capable of accepting sludges, septages, manures and residuals. Similarly, manures are being increasingly scrutinized for the impact from storage facilities on ground and surface waters. The net effect of these regulations has been dramatic increase in the cost for treatment and disposal of sludges, manures and septages.

Several Processes to Significantly Reduce Pathogens (PSRP) have been developed that reduce both pathogen levels and the attractiveness of sludges to disease vectors. The processes effectively reduce pathogenic viruses and bacteria by about 90%. The PSRP process that have been recognized are aerobic digestion, anaerobic digestion, lime stabilization, air drying and composting.

Aerobic digestion involves biochemical oxidation of sludge in an open or closed aerobic tank and can be practiced in a batch or continuous mode. The digestion requires 40 to 60 days residence time at temperatures from 15 to 20 degrees Celsius. Anaerobic digestion is conducted in the absence of air. Even with added heat the process still requires 15 days to digest the waste.

In air drying the wet sludge is generally applied to sand and/or gravel beds to a depth of up to about 9 inches. To be considered a PSRP the sludge must be air dried for at least 3 months. Lime stabilization involves adding lime to sludge in a sufficient quantity to produce a ph of 12 after 2 hours. The treatment period is short. However, lime is expensive and the pathogens can regrow if the pH drops below 11. Composting to meet PSRP conditions requires treatment for at least 5 days at 40 degrees Celsius with 4 hours at a temperature of at least 55 degrees Celsius.

The PSRP processes can be combined with other processes to further reduce the pathogen to a level below the detection limit. Some of the same processes discussed as PSRP processes can qualify as a PFRP (Process to Further Reduce Pathogens) if operated at high temperature.

Treatment processes demonstrated to be effective in reducing pathogen content of waste sludges, septage and waste water residuals have been identified and defined by the EPA. Regulations (40 CFR parts 257 and 503) provide necessary criteria for sludge product treatment and usage. States have the option to either adopt federal standards or justify and adopt other equivalent or more restrictive use limitations.

Methods generally approved as Process to Further Reduce Pathogens (PFRP), the most substantial pathogenic organism reduction option, can be summarized as thermal treatments from external heat sources such as incinerators and dryers (pressurized or at ambient atmospheric pressures). Heat treatment for pathogenic reductions also include thermophilic decomposition (composting) and thermophilic aerobic digestion which utilize temperature increases from biologic activity to reduce pathogenic organisms to PFRP standards. Non-thermal processes for PFRP treatments include chemical disinfection and radiation of sludge solids (electron, gamma ray, ultraviolet).

The reuse of sludge is also limited by concerns other than pathogenic content. End product qualities and raw waste constituents (heavy metals) have frequently affected the ability to use the end product in certain environments. While not a significant problem in sewage sludges, soluble arsenic compounds may be of concern in specialized situations.

All of the approved processes involve the use of substantial amounts of land or equipment to hold large bodies of waste for long holding periods or the application of heat from external sources to reduce the holding time during treatment.

Other processes for treatment of waste can be utilized if the use proves that the process results in effective removal of pathogens from the waste.

STATEMENT OF THE PRIOR ART

Some of the other processes for reducing the pathogen level of solid waste are disclosed in the patent literature.

Meehan, et al. (U.S. Pat. No. 4,793,927) chemically disinfects sewage with an ammonia source and converts it into an impermeable, friable mass with cement and silicate. A strongly alkaline environment kills bacteria and viruses. No thermal process is involved and the resulting alkaline product is not suitable for use as an agricultural amendment to soils in the western United States which are usually alkaline.

Webster, et al. (U.S. Pat. No. 4,028,130) discloses treatment of municipal sludge by incorporating the sludge in a hardenable composition including lime, fly ash and in some cases alkaline earth metal sulfates and/or soil or other inert additives. The material cures in air over a long period.

Boyko (U.S. Pat. No. 4,191,549) combines sludge with carbonized cellulose and coal ash to produce a grainy product that is sterilized by chlorination.

Bolsing (U.S. Pat. No. 4,997,486) produces a product containing calcium sulfate useful as a fuel or cement clinker by combining used hydrocarbon oils with waste sulfuric acid and powdered limestone or fly ash to form a solid mass. Disinfection is not an issue.

King (U.S. Pat. No. 4,615,809) stabilizes hazardous industrial organic sludges by combining the sludge with Portland cement, fly ash, calcium sulfate and lime to form a product with soil-like consistency. Again disinfection is not discussed.

Pichat (U.S. Pat. No. 4,547,290) treats very acidic or basic liquid wastes by first dispersing clay in the waste at a temperature between 0 and 150 degrees Celsius followed by adding lime and then a hydratable binder.

There are several patents which utilize sterilization and disinfection of sewage sludge with lime or other calcium oxide sources.

Wurtz dewaters sludge to form a cake and reacts the cake with calcium oxide in a high intensity reactor to produce a stabilized sludge pellet. The addition of lime results in an exothermic reaction raising the temperature to 170 degrees Fahrenheit to 210 degrees Fahrenheit. The pellet is burned to produce heat and the calcium oxide is separated from the ash and recycled. The process requires a special reactor for intimate mixing of the dewatered sludge and lime. Lime is an expensive reagent and the resultant product is alkaline.

Nicholson, et al. (U.S. Pat. No. 4,554,002) convert sewage sludge into a useful fertilizer by treating the sludge with lime and cement kiln dust. The alkalinity of the mixture and the exothermic heat developed by hydration of the lime reduce the level of pathogens and may meet PFRP criteria. Again the resulting product is alkaline and is not useful with alkaline soils. The process requires the use of lime and/or kiln dust having high calcium content in order to generate the necessary pH and temperature for disinfection. High lime content kiln dusts are expensive and are in limited supply.

STATEMENT OF THE INVENTION

The present invention provides a process for disinfection of sludge and other feces contaminated solid wastes that is based on the use of readily available and inexpensive materials. The process of the invention effectively eliminates at least 90% of pathogenic organisms. The resulting product is safe for application to land for grazing and crop production. The process of the invention reduces to the point of elimination the presence of viable ascarid eggs, ova and cysts in the finished product. The process can be readily controlled to produce products useful on any type of soil. The process is also extremely flexible. The proper selection of reactants can result in formation of soil amendments, fertilizers and agricultural minerals. The end products can also be useful in road construction or as industrial chemicals.

The process of the invention utilizes simple equipment for a short holding time to pasteurize the solid waste. The use of inexpensive starting materials and the generation of saleable end products provides a substantial economic benefit to waste generators and to waste converters to process the waste.

The process of the invention can also be readily modified by selection of reagents and additives to eliminate or reduce to safe levels soluble heavy metal ions which otherwise may limit use of the end product or reduce its selling price.

The solid waste treatment process of the invention is capable of handling a large volume of sewage sludge, septages, residuals or manures in a cost effective manner. The process can be readily practiced at a waste treatment plant or in a separate facility operated by a third party.

The solid waste disinfection process of the invention operates by treating the sludge with an acid-base pair that exothermically react to generate a temperature for a time sufficient to reduce the pathogens in the waste by at least about 90%. The acid-base pair may also generate a by-product that chemically disinfects the waste. Preferably the process kills, inactivates or destroys substantially all pathogenic organisms contained in the waste.

The acid and/or base utilized in the process affects the properties and value of the end product. For example, the use of nitrogen or phosphorous containing acid-base pairs adds fertilizer value. The formation of calcium sulfate from the acid-base pair provides a soil amendment. The adjustment of pH by selection of a suitable strong acid provides a product useful to reduce alkalinity of alkaline soils. The acid-base pair can be selected to generate a daughter compound that acts as a chemical disinfectant such as sulfur dioxide, ammonia, chlorine or bromine. The acid-base pairs can also generate species that bind or reduce the solubility of certain heavy metals. Preferred acid base pairs are Lewis acids and Lewis bases.

End properties of the produce such as volume and physical handling or physical properties can deleteriously affect use of the product in certain applications and therefore reduce its value. The properties can also effect handling, transportation costs and costs associated with the end use application.

The acid-base pair can be selected to provide a product having sludge-like properties or further dried to a soil-like material. The acid-base pair can also be selected to provide agglomeration of the product into a friable mass useful to aid in soil aeration by selection of a pozzolanic source of base or other binder-type reagent. Bound forms of calcium oxide in fly ash appear to provide slow release of calcium which contributes to the necessary holding time at temperature to pasteurize the solid waste.

These and many other features and attendant advantages of the invention will become apparent as the invention becomes better understood by reference to the following detailed description when considered in conjunction with the accompanying drawings.

CITED REFERENCE

1. Kirk-Othmer, "Concise Encyclopedia of Chemical Technology", John Wiley & Sons, 1985.
2. M. J. Pelczar and R. D. Reid, "Microbiology" 3rd Ed., McGraw-Hill, 1975.

DETAILED DESCRIPTION OF THE INVENTION

The solid waste (SW) treatment process of the invention can be represented by the following reaction:

$$A+B+SW+P \rightarrow AB+RP \leq 0.1P$$

The reaction of an acid (A) and base (B) in presence of solid waste containing pathogens (P) results in formation of a salt (AB) and a reaction product (RP) containing no more than 10% of the pathogens (P) present in the waste.

Solid waste containing fecal matter can be municipal sewage sludge, waste treatment residual, septage or manure. The solids content of the waste can be from 3 to 85% by weight, usually 10–30% by weight. The solid waste suspension is usually present in an amount from 10 to 40%. The amount of acid and base depends on the strength of the acid and base and the exothermic heat of reaction developed by the acid-base pair and any other exothermic heat developed such as on hydration of the acid or base. Generally the acid is present in an amount from 5–25% by weight and the base in an amount from 10–40% by weight. The acid-base should be present in amounts within ±5 to 10% of neutralization. An excess of acid is required for agricultural amendment to alkaline soils.

The preferred acids are strong mineral acids, although organic acid such as acetic acid may be utilized. Acids introducing hazardous materials such as arsenic containing acids or hydrofluoric acid should be avoided. A table illustrating representative acids follows.

TABLE 1

| | |
|---|---|
| $H_2SO_4$ | Sulfuric Acid (conc. and/or dilute) |
| $H_2SO_4 + SO_3$ | Oleum (> 100% by weight, fuming $H_2SO_4$) |
| $SO_3$ | Sulfur Trioxide (Sulfuric Anhydride) |
| $H_{n+2}P_nO_{3n+1}$ | Phosphoric Acids (Conc. and/or dilute) |
| n = 1 | Mono-(ortho) - Phosphoric Acid |
| = 2 | di-(pyro) - Phosphoric Acid |
| = 3 | tri (tripoly) - Phosphoric Acid |
| = 4 | Tetra - Phosphoric Acid |
| = n | Polyphosphoric Acid (1) P. 870 |
| $H_2SO_3$ | Sulfurous Acid (conc. and/or dilute) |
| $SO_2$ | Sulfur Dioxide |
| $HNO_3$ | Nitric Acid (conc. and/or dilute) |
| $CH_3CO_2H$ | Acetic Acid (Glacial, 99.8% and/or dilute) |
| HCl | Hydrochloric Acid (conc. and/or dilute) |

Strong inorganic bases are also preferred though weaker bases can be utilized. Representative bases are listed in the following table:

TABLE 2

| | |
|---|---|
| NaOH | Sodium Hydroxide |
| KOH | Potassium Hydroxide |
| Ca(OH)$_2$ | Calcium Hydroxide |

TABLE 2-continued

| | |
|---|---|
| Mg(OH)$_2$ | Magnesium Hydroxide |
| CaO | Calcium Oxide |
| MgO | Magnesium Oxide |
| NH$_3$ | Ammonia |
| NH$_4$OH | Ammonium Hydroxide |

Other minerals and/or by-products that contain these bases, E.G., Fly ash, cement kiln dust, Arco "Gyp" (calcium sulfite), etc. can also be utilized.

Representative Acid-Base pair reactions follow:

TABLE 3

| ACID (A) | BASE (B) | PRODUCTS (AB) |
|---|---|---|
| $H_2SO_4$ | NaOH | NaHSO$_4$, Na$_2$SO$_4$, H$_2$O |
| $H_2SO_4$ | KOH | KHSO$_4$, K$_2$SO$_4$, H$_2$O |
| $H_2SO_4$ | Ca(OH)$_2$ | Ca(HSO$_4$)$_2$, CaSO$_4$.xH$_2$O, H$_2$O |
| $H_2SO_4$ | Mg(OH)$_2$ | Mg(HSO$_4$)$_2$, MgSO$_4$.xH$_2$O, H$_2$O |
| $H_2SO_4$ | CaO | Ca(HSO$_4$)$_2$, CaSO$_4$.xH$_2$O, H$_2$O |
| $H_2SO_4$ | MgO | Mg(HSO$_4$)$_2$, MgSO$_4$.xH$_2$O, H$_2$O |
| $H_2SO_4$ | NH$_3$ | NH$_4$HSO$_4$, (NH$_4$)$_2$SO$_4$ |
| $H_2SO_4$ | NH$_4$OH | NH$_4$HSO$_4$, (NH$_4$)$_2$SO$_4$, H$_2$O |
| SO$_3$ | | same sulfite reaction products as H$_2$SO$_4$ |

Other mineral or salts that can be added to the reacting mixture or substituted for all or a part of the base or acid are listed below:

TABLE 4

Apatite—A natural calcium phosphate (usually containing fluorine) e.g., Ca$_{10}$F$_2$(PO$_4$)$_6$, Dolomite, CaSO$_3$, K$_2$SO$_3$, Na$_2$SO$_3$, NH$_4$HSO$_4$, (NH$_4$)$_2$SO$_4$, KHSO$_4$, K$_2$SO$_4$, KH$_2$PO$_4$, K$_2$HPO$_4$, K$_3$PO$_4$, NH$_4$H$_2$PO$_4$ worlds leading phosphate fertilizer, (NH$_4$)$_2$HPO$_4$ worlds leading phosphate fertilizer, (NH$_4$)$_3$PO$_4$, KCl, NH$_4$Cl, CaCl$_2$, KNO$_3$, NH$_4$NO$_3$, Ca(NO$_3$)$_2$, S, Urea, NaNO$_3$.

These salts or minerals may contribute to the exothermic reaction and when they are present in amounts which raise the total nitrogen or phosphorous content at least 5% by weight, the product can be marketed as a fertilizer. Dolomite adds magnesium values to the end product.

The reaction of apatite with concentrated sulfuric acid follows $$Ca_{10}F_2(PO_4)_6 + 10H_2SO_4 + 10xH_2O \rightarrow 6H_3PO_4 + 10CaSO_4.x\,H_2O + 2HF \qquad (1)\text{ p. 467}$$

Where x=0.5 to 0.7, or 2.0

Strongly Exothermic

The phosphoric acid reaction product is a fertilizer and calcium sulfate dihydrate, gypsum, is a soil amendment. The phosphate ion may bind and precipitate heavy metals such as cadmium and arsenic. Since the reaction can liberate hydrogen fluoride (HF) it should be monitored. Since the amount of fluorine in apatite ore can vary, the ore should be assayed before use in the treatment of solid waste.

Solid wastes containing water soluble arsenic compounds may be treated with sulfuric acid and calcium hydroxide in the presence of sulfate and ferrous and/or ferric ions to form water-insoluble arsenic salts as disclosed in U.S. Pat. No. 4,118,243. Lead and cadmium wastes are removed from incinerator ash by use of phosphoric acid and lime as disclosed in U.S. Pat. No. 4,737,356. U.S. Pat. No. 3,837,872 discloses reducing solubility and mobility of certain heavy metals in sludge. The disclosures of these patents are incorporated herein by reference.

The process of the invention also contemplates the presence of gaseous species which contribute to disinfection. Gases such as oxygen, ozone, steam ammonia, sulfur dioxide or chlorine can be bubbled through the suspension. Gaseous species such as ammonia or sulfur dioxide can be generated as a result of reaction of the acid-base pair with each other or with components of the sludge or other solid waste. $SO_2$ can be generated as a chemical disinfectant by the thermal decomposition of salts such as sodium metabisulfite which can be present in amounts from 0.1 to 5% by weight or more.

The generation of gaseous, dissolved or solid compounds that enhance pathogen reduction may permit the use of lower temperatures and/or shorter treatment intervals. It is believed that petroleum coke and fly ash with high calcium sulfite content from desulferization process when reacted with sulfuric acid will produce significant evolution of sulfur dioxide which can achieve disinfection of sewage sludge and may not require as high a temperature as thermal pasteurization to achieve disinfection. The use of low acid pH is believed to cause chemical disinfection just as higher pH does as disclosed in U.S. Pat. No. 4,793,927.

The characteristics of the end product can be modified by including 1 to 30 percent by weight of an agglomerating agent. A preferred agent is a pozzolanic material which causes aggregation of particles as it cures. Pozzolanic materials generally include aluminosilicate structures which can bind together especially in the presence of lime, calcium sulfate or other basic substances. Certain materials such as fly ash, cement klinker and kiln dust have pozzolanic activity and contain sufficient base such as calcium oxide and/or calcium hydroxide that which reacted with an acid, generate exothermic heat sufficient to pasteurize sewage sludge.

Fly ash utilized in the invention demonstrates slow release of base. This contributes to maintaining the suspension at minimum temperature for at least 30 minutes. The fly ash need only contain a moderate amount of calcium oxide, generally from 10–25% by weight of free CaO and 30–60% total CaO. This is in contrast to the N-Viro process disclosed in the Nicholson patent which requires a very high content (at least about 50% free lime) in the kiln dust or the addition of free lime in order to generate the pH and temperature necessary for chemical disinfection.

The fly ash is preferably unquenched since quenching would hydrate the metal oxides and decrease the exothermic heat contributed by hydrating the salts. Part of the fly ash can be substituted with up to 50% by weight of other calcium sources or other materials with pozzolanic activity such as kiln dust or cement clinker dust. Unquenched F-type fly ash (UQFA) having a high pH of from 11–13 is preferred for use on this invention. Another measure of base content is the $\Delta T$ generated on reaction of 60 g of fly ash or other base with 100 ml of $H_2O$. The fly ash utilized in the process of the invention preferably has a $\Delta T$ in water of at least 50 degrees Celsius. The chemical analysis of a UQFA fly ash follows:

TABLE 5

| Constituents | WT. % As Received |
| --- | --- |
| Calcium Oxide as CaO (free) | 16 |
| Aluminum as $Al_2O_3$ | 4.8 |
| Iron as $Fe_2O_3$ | 4.2 |

TABLE 5-continued

| Constituents | WT. % As Received |
| --- | --- |
| Magnesium as MgO | 2.5 |
| Acid Insoluble (silica) | 36 |
| Total Alkalinity as $CO_2$ | 34 |
| Calcium as CaO | 35 |
| Potassium as $K_2O$ | 0.30 |
| Total Sulfate as $SO_4$ | 10.3 |
| Gypsum as $CaSO_4.2H_2O$ | 18.04 |
| Moisture | None Detected |

The following examples of disinfection of solid waste were conducted. The examples were all monitored to determine whether they met EPA criteria for a PFRP pasteurization—a minimum of 70 degrees Celsius (158 degrees Fahrenheit) for a minimum of thirty minutes. Sewage sludges are appropriately stored to prevent odor generation and regrowth of pathogenic organisms.

Figures 1, 2:
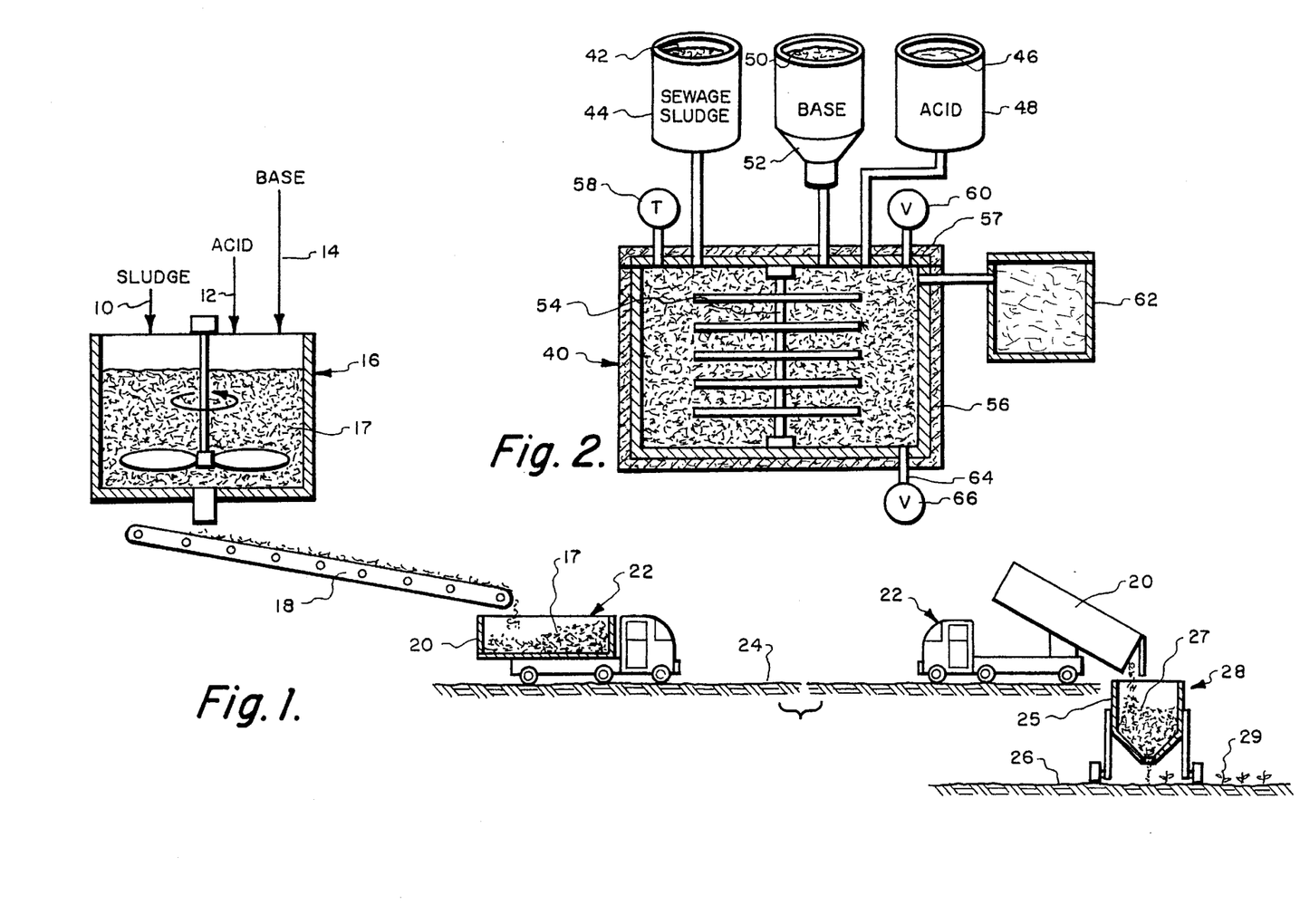
FIG. 1 is a schematic view of a simplified system for disinfecting sewage sludge and converting it to an agricultural product in accordance with the invention.
FIG. 2 is a schematic view of a batch system for disinfecting solid waste in accordance with the invention.

The process of the invention can be practiced in several different ways. In the simplest form as shown in FIG. 1, dewatered sewage sludge 10 is mixed with an acid 12 and a base 14 in an insulated mixer 16. The mixture 17 is conveyed by a conveyer 18 into the body 20 of a truck 22. The mixture 17 is maintained in the truck body 20 for a minimum of time at a temperature sufficient to pasteurize the mixture. The pasteurization reaction may proceed while the truck 22 travels on a highway 24 to a field 26. The pasteurized product 27 can be loaded into the hopper 25 of a spreader 28 which spreads the mixture onto the field containing crops 29. The pasteurized product 27 need not be spread immediately. The product 27 can be stored in a bin or out in the open until needed.

The process operates autogenously. The heat needed is developed by the exothermic reactions occurring on mixing the acid and base with the sludge. Pressure is not required. However, pressure may be beneficial and can also be autogenously developed by placing the reaction mixture in a closed reaction vessel 40 as shown in FIG. 2. A batch process proceeds by feeding sludge 42 from tank 44, acid 46 from storage tank 48 and base 50 from storage hopper 52. The reaction vessel 40 can be equipped with a stirrer 54. The vessel may contain an insulation jacket 56 or a heating jacket, not shown, if it is necessary to add heat to raise the temperature or shorten the holding time. An insulated lid 57 may contain a temperature sensor 58, and a pressure release valve 60. Off gases such as $SO_2$, $H_2S$ or $NH_3$ can be vented to an absorber or scrubber 62. The finished product can be removed through outlet 64 when valve 66 is open.

Figure 3:
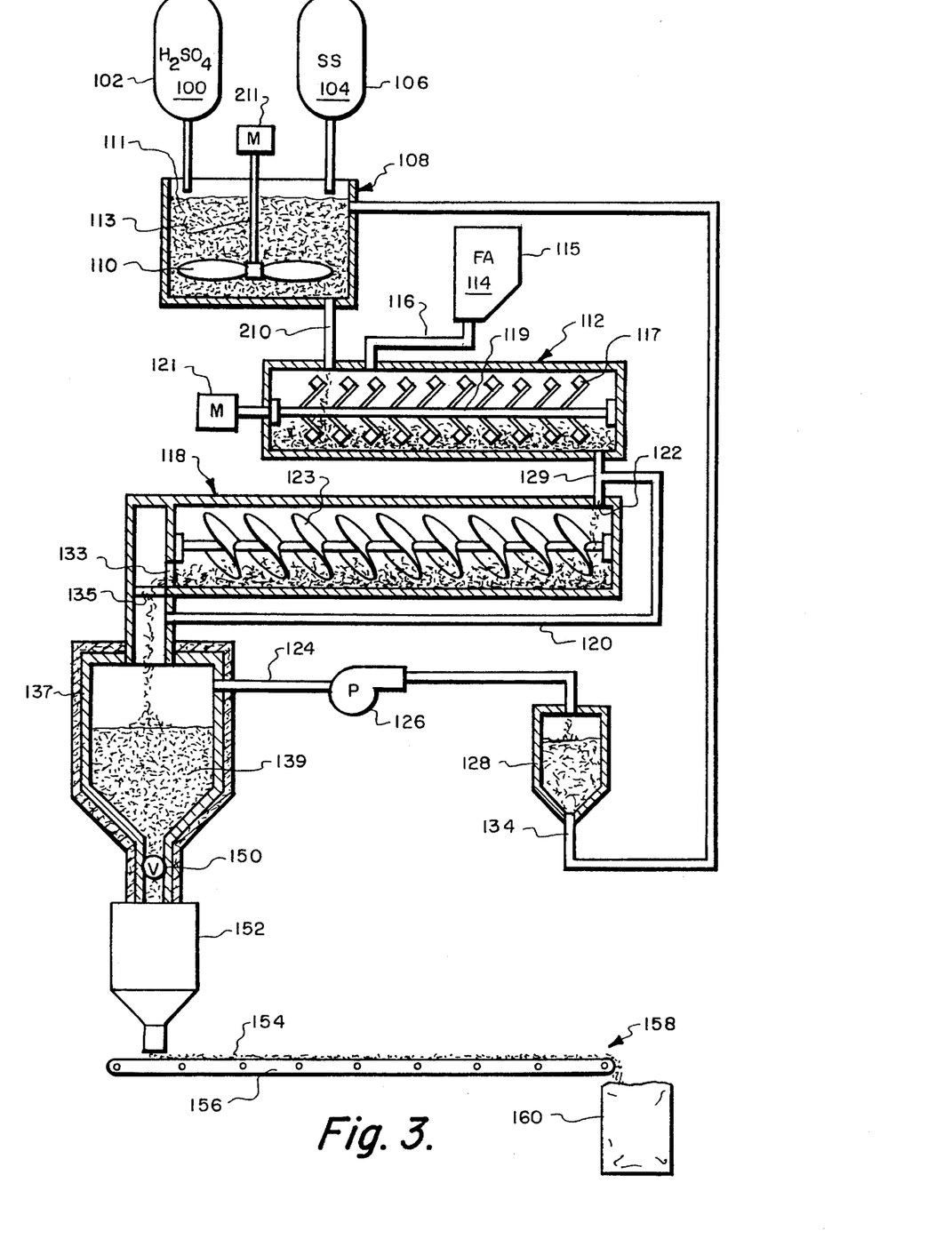
FIG. 3 is a schematic view of a semi-continuous system for thermal pasteurizing of solid waste according to the invention.

A semi-continuous system is illustrated in FIG. 3. Acid 100 such as concentrated sulfuric acid from storage tank 102 and sewage sludge 104 from hopper 106 are fed into insulated mixer 108 containing a mixing blade 110 is connected to a shaft 113 and is driven by a motor 211. The sludge-acid 111 mixture feeds through outlet 210 into a mixer such as an insulated pug mill 112. Granular base 114 such as fly ash is fed from hopper 115 into the forward end 116 of pug mill 112. The pug mill 112 contains paddles 117 mounted on a shaft 119 driven by a motor 121. The paddles 117 push the material forward as they cut through the fly ash, acid, sewage sludge mixture. The mixture is intimately mixed in the pug mill and exothermic reaction begins. The hot mixture proceeds through the outlet 129 and into the inlet 122 of a well insulated rotary oven 118. The rotary oven 118 can contain a spiral thread 123 that moves the mixture forward as the oven 118 rotates. The rotary oven 118 has a long residence time, at least sufficient enough to allow the mixture to react and sterilize at least 90% of the pathogens in the sludge. Preferably all the pathogens in the sludge are killed. Gases evolved in the oven can be recycled through line 120 to the inlet 122 to the rotary oven. Some of the gases can be withdrawn through the outlet 124 by means of a pump 126 and are absorbed in the liquid in gas absorber 128.

In the case of sulfuric acid, the $H_2S$ and $SO_2$ are absorbed into an organic amine or a caustic such as potassium hydroxide. The absorption scrubber reactions for KOH are as follows:

$$SO_2 + KOH \rightarrow KHSO_3$$

$$H_2S + KOH \rightarrow K_2S + H_2O \text{ or } KHS + H_2O$$

The spent liquid in the absorber 128 can be recycled to the mixer 108 through outlet 134 in order to incorporate the potassium salt in the mixture. The disinfected mixture exits the rotary oven through an outlet 133 which connects to inlet 135 to an insulated holding vessel 137. The reaction product 139 can be recovered through outlet valve 150 as needed and subdivided in mill 152 to form a granular product 154.

The granular product is conveyed by trough conveyer 156 to the bagging station 158 where it is packaged in bags 160.

The rotary oven can be replaced with an insulated extruder. The extruder can have a resin fiberglass barrel which will provide heat insulation and self lubrication for the slurred mixture. A suitable conveyor is a 24 inch diameter HETRON 980 resin fiberglass conveyor that can move 1920 pounds/min at 15 rpm.

EXAMPLE 1

Sewage sludge (SS, 250 gm, 20% solids) is placed in a Nalgene reaction chamber followed by sulfuric acid (93%, d 1.8279, 35 mL, 64 gm) and the contents are rapidly mixed. Then fly ash (75 gm, 25% CaO) is added portionwise (about three equal amounts), each time mixing rapidly until a homogenous slurry is obtained (about 30 seconds). The chamber is then sealed off by the application of a styrofoam lid equipped with a thermometer. When the thermometer reaches 82 degrees Celsius (180 degrees Fahrenheit) a stopwatch is activated followed by the recording of temperature as a function of time (minutes). The amount of time that the temperature exceeded 82 degrees Celsius (180 degrees Fahrenheit) was ninety (90) minutes. This is well in excess of the 30 minutes at 82 degrees Celsius required by the EPA for pasteurization. The product was grey and friable. It had a slight odor of manure after drying at 45 degrees Celsius (113 degrees Fahrenheit) after grinding. The finished product was granular in texture.

The dried product was analyzed for sodium and calcium by ICP. The gypsum ($CaSO_4 \cdot 2H_2O$) content was calculated at 36–64%. Sodium concentration was found to be 2,618 mg/Kg.

The presence of other metals and metalloids in the dried product was determined to be as follows:

TABLE 6

| CON-STITUENT | SAMPLE RESULTS | UNITS | Regulatory Criteria STLC mg/L | TTLC mg/kg |
|---|---|---|---|---|
| Antimony | BDL* | mg/kg | 15. | 500. |
| Arsenic | BDL | mg/kg | 5.0 | 500. |
| Barium | BDL | mg/kg | 100. | 10,000. |
| Beryllium | BDL | mg/kg | 0.75 | 75. |
| Cadmium | 11.5 | mg/kg | 1.0 | 100. |
| Chromium | 46.9 | mg/kg | 5.0 | 500. |
| Cobalt | BDL | mg/kg | 80. | 8,000. |
| Copper | 192.1 | mg/kg | 25. | 2,500. |
| Lead | 149.7 | mg/kg | 5.0 | 1,000. |
| Molybdenum | BDL | mg/kg | 350. | 3,500. |
| Nickel | 34.9 | mg/kg | 20. | 2,000. |
| Selenium | BDL | mg/kg | 1.0 | 100. |
| Silver | 16.7 | mg/kg | 5.0 | 500. |
| Thallium | BDL | mg/kg | 7.0 | 700. |
| Vanadium | 87.3 | mg/kg | 24. | 2,400. |
| Zinc | 249.5 | mg/kg | 250. | 5,000. |

*BDL = Below Detection Limits

The internal temperature of the contents as a function of time were determined. The composition of the mixture is as follows:

| SAMPLE | SEWAGE SLUDGE gm | $H_2SO_4$ (1937) gm | FLY ASH gm | WATER gm |
|---|---|---|---|---|
| D | 0 | 64 | 75 | 200 |
| E | 250 | 64 | 75 | 0 |
| F | 0 | 0 | 0 | 250 |

Figure 4:
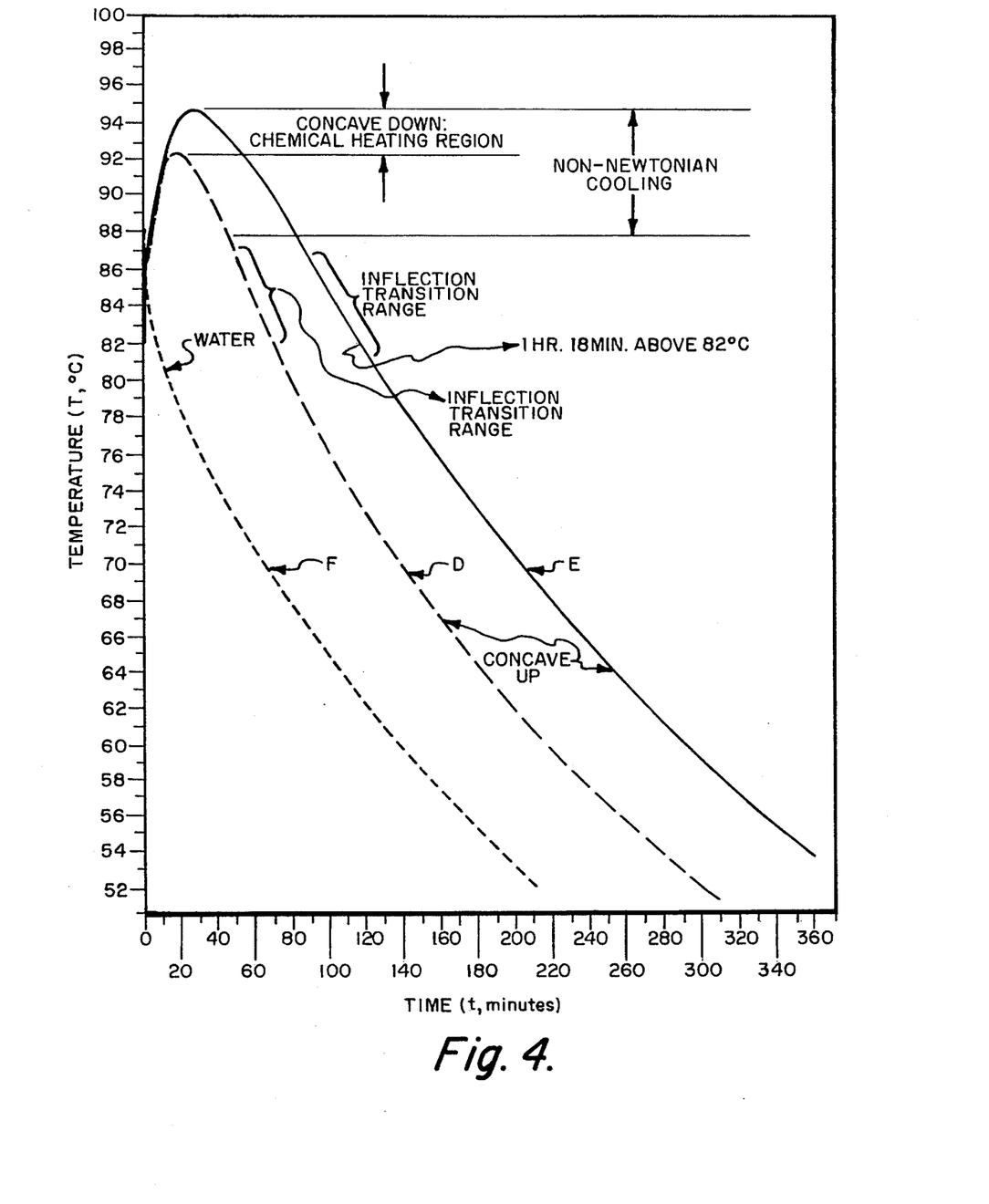
FIG. 4 is a series of curves showing the temperature history of water, sulfuric acid-fly ash and sulfuric acid-fly ash and sewage sludge mixture.

The temperature curves are shown in FIG. 4. A second derivative plot, not shown, was utilized to determine the inflection change.

The water curve, F, demonstrates classical Newtonian cooling. The curve is concave up in form. Both curves for the D and E curves containing fly ash-acid mixtures are concave down at the top, then proceed through an extended inflection transition range and then to a concave up region. The D and E curves are non-Newtonian. The concave down region shows heat evolution for 1 hour 18 minutes demonstrating the encapsulation of the calcium oxide and calcium hydroxide bases in fly ash and the slow release. Newtonian cooling does not start until after the inflection transition range—the portion of the curves which are concave up in shape.

Figure 5:
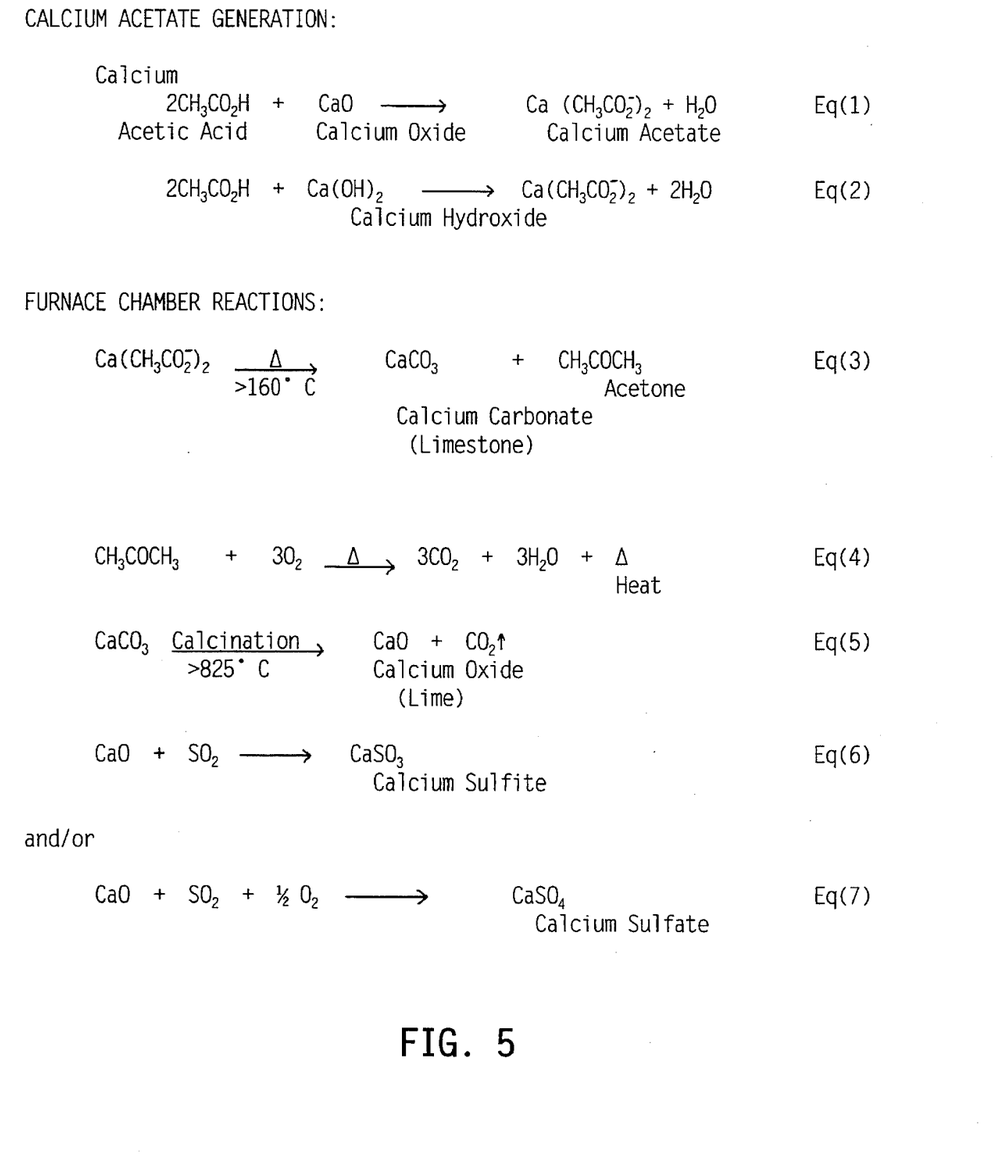
FIG. 5 is a chemical reaction sequence showing use of the acetic acid-lime base pair to treat solid waste.

Example 1 can be repeated substituting 65% by weight of dewatered septage or cow manure (20% solids) for the sewage sludge. The exothermic reaction between sulfuric acid and the fly ash would proceed to a temperature for a time sufficient to pasteurize the septage or manure and form an agglomerated product. A granular product is formed after drying and grinding. Concentrated phosphoric acid and lime exothermically react with sewage sludge to form pasteurized sludge and calcium phosphate. The calcium phosphate can bind ions such as lead, arsenic or cadmium. The acid-base pair, glacial acetic acid and hydrated lime exothermically react in the presence of sewage sludge to pasteurize the sludge and form calcium acetate. Limestone generated in situ by the thermal decomposition of calcium acetate as in a furnace chamber, reacts with $SO_2$ such as from stack gases to form calcium sulfite and calcium sulfate according to the reaction shown in FIG. 5.

EXAMPLE 2

Example 1 was repeated in a more insulated reaction chamber. The time at 82 degrees Celsius (180 degrees Fahrenheit) was increased from 91 minutes to 106 minutes.

EXAMPLE 3

350 grams of sewage sludge (20% by weight) solids and 95 grams of UQFA were combined with 93% sulfuric acid and equivalent amounts of concentrated phosphoric and glacial acetic acid in the following proportions.

TABLE 7

| Samples | 93% $H_2SO_4$ Grams | $H_2SO_4$ Mole % | $H_3PO_4$ or HOAC Mole % |
|---|---|---|---|
| 5,10 | 8 | 12.5 | 87.5 |
| 6,11 | 16 | 25.0 | 75 |
| 7,12 | 32 | 50.0 | 50 |
| 8,13 | 48 | 75.0 | 25 |
| 9,14 | 59.6 | 90 | 10 |

HCl could not be combined with sulfuric acid since it is insoluble in concentrated sulfuric acid. The temperature histories of these experiments follow:

TABLE 8

| | $H_2SO_4$ 93% # gm | $H_3PO_4$ 85% # gm | Glacial Acetic Acid 99% # gm | HCL 34–37% # gm | Sewage Sludge # gm | Fly Ash # gm | Max. Temp. °C. | Minutes at Temp. above 82° C. |
|---|---|---|---|---|---|---|---|---|
| 1 | 64.0 | | | | 350 | 95 | 99.5 | 80 |
| 2 | | 70.04 | | | 350 | 95 | 59.8 | 0 |
| 3 | | | 73.03 | | 350 | 95 | 72.9 | 0 |
| 4 | | | | 120.72 | 350 | 95 | 67.2 | 0 |
| 5 | 8 | 61 | | | 350 | 95 | 60.1 | 0 |
| 6 | 16 | 53 | | | 350 | 95 | 63.9 | 0 |
| 7 | 32 | 35 | | | 350 | 95 | 71.8 | 0 |
| 8 | 48 | 17.5 | | | 350 | 95 | 80.8 | 0 |
| 9 | 57.6 | 7 | | | 350 | 95 | 92.0 | 51 |
| 10 | 8 | | 64 | | 350 | 95 | 74.1 | 0 |
| 11 | 16 | | 55 | | 350 | 95 | 72.5 | 0 |
| 12 | 32 | | 37 | | 350 | 95 | 79.0 | 0 |
| 13 | 48 | | 18.3 | | 350 | 95 | 83.2 | 21 |
| 14 | 57.6 | | 7.3 | | 350 | 95 | 96.5 | 68 |

Phosphoric acid-fly ash base pair did not achieve a temperature of 70 degrees Celsius. When about one-half of sulfuric acid is replaced with an equivalent amount of phosphoric acid, temperatures above 70 degrees Celsius are achieved. Glacial acetic in mixture from 0 to 100% with sulfuric acid achieves a temperature of 70 degrees Celsius and in mixture with sulfuric acid containing no more than about 25% equivalent amount of acetic acid achieves a temperature over 80 degrees Celsius.

EXAMPLE 4

Sewage sludge (300 gm) was placed in an insulated reaction vessel. Sulfuric acid (93%, 64.85 gm) was added, followed by the addition of ARCO "Gypsum" (75 gm, delta T=0.8 C, pH=12.9) to the vessel and mixed thoroughly. The maximum temperature attained was 70.8 C along with the liberation of much $SO_2$. When the same procedure is carried out substituting unquenched fly ash for ARCO "Gypsum", the maximum temperature is about 95 degrees Celsius. ARCO "Gypsum" was also analyzed for calcium (via ICP) and sulfate (gravimetrically) and the percent calcium sulfate dihydrate (gypsum) was calculated as 53.00 and 2.49%, respectively. The large difference in percent gypsum calculated from the two different techniques reveals that the material must contain mostly calcium sulfite rather than calcium sulfate. Calcium sulfite or other metal sulfite could be utilized as an additive to an exothermic formulation to provide chemical disinfection by the $SO_2$ produced by acidification of the sulfite.

EXAMPLE 5

Four experiments were run to determine the effect of sodium meta-bisulfite ($Na_2S_2O_5$) on sterilization of sewage sludge. The components were placed inside an insulated reaction vessel in the following order: fly ash, sodium metabisulfite, sewage sludge and last sulfuric acid. The mixture was then rapidly and thoroughly stirred, the chamber sealed and the temperature recorded as a function of time. After 5 hours the vessels were opened and the contents were transferred to Whirl-Pak bags and sealed (double bagged). The bags were placed in insulated mugs and quickly transported to an offsite location where an insulated container (equipped with Blue Ice) had been frozen for 24 hours. The bags were transferred to the insulated container, sealed and transported to a lab for pathogen analysis. The composition and thermal response of the four samples is summarized in the following table:

TABLE 9

| Sample | Sewage Sludge | $H_2SO_4$ (93%) | Fly Ash | $Na_2S_2O_5$ | Min. at temp. above 82° C. |
|---|---|---|---|---|---|
| A | 250 gm | | | | Room temp. |
| B | 250 gm | 35 mL | | | Peak at 55 C. |
| C | 250 gm | 35 mL | 75 gm | | 1 hr., 32 min. |
| D | 250 gm | 35 mL | 75 gm | 1 gm | 1 hr., 36 min. |

Sulfuric acid alone, only raised the temperature to 55 degrees Celsius. Sulfuric acid and fly ash raised the temperature to above 82 degrees Celsius for 92 minutes. The addition of sodium meta-bisulfite raised the temperature to above 82 degrees Celsius for 96 minutes, an insignificant difference. However, substantial evolution of $SO_2$ was noted.

Pathogen analysis was initially conducted by inoculating a set of 15 tubes and allowing them to incubate. Sample B showed 5 positive tubes out of 15, Sample C showed 1 positive tube while Sample D showed no positive tubes. Temperature is apparently crucial to the process since Sample B only reached 55 degrees Celsius while Samples C and D reached 101.6 degrees Celsius and 101.8 degrees Celsius, respectively and remained above 82 degrees Celsius for over 90 minutes. The improvement of D appears to be due to the evolution of SO₂ from the sodium meta-bisulfite. Further data on pathogen testing is presented in the following table.

TABLE 10

| SAMPLE IDENTIFICATION | SAMPLE A UNTREATED SLUDGE | SAMPLE B TREATED SLUDGE | SAMPLE C TREATED SLUDGE | SAMPLE D TREATED SLUDGE |
|---|---|---|---|---|
| FECAL COLIFORM # PER 100 ML | 70,000,000 | <200 | <200 | <200 |
| LOG MPN VALUE | 7.85 | 2.3 | 2.3 | 2.3 |
| LOG REDUCTION LOG A/LOG B,C,D | NA | 5.5 | 5.5 | 5.5 |
| FECAL STREPTOCOCCUS # PER 100 ML | 9,000,000 | <200 | <200 | <200 |
| LOG MPN VALUE | 6.95 | 2.3 | 2.3 | 2.3 |
| LOG REDUCTION LOG A/LOG B,C,D | NA | 4.7 | 4.7 | 4.7 |

Further experiments were conducted to determine the effect of varying the amounts of concentrated sulfuric acid, unquenched fly ash and sodium meta-bisulfite added to dewatered sewage sludge (20% solids). The composition of the initial and final products and time pathogen content of time products are presented in the following tables:

TABLE 11

| SAMPLE | SS, gm | WT, % | 93% $H_2SO_4$ gm | WT. % | UQFA $\Delta 1 = 23$ C. gm | WT % |
|---|---|---|---|---|---|---|
| E | 60 | 100 | | | | |
| F | 250 | 98.96 | 2.64 | 1.04 | | |
| G | 250 | 97.98 | 5.15 | 2.02 | | |
| H | 250 | 95.98 | 10.48 | 4.02 | | |
| I | 250 | 91.97 | 21.84 | 8.03 | | |
| J | 250 | 83.95 | 47.81 | 16.05 | | |
| K | 250 | 79.31 | 64.21 | 20.37 | | |
| L | 300 | 68.17 | 64.02 | 14.55 | 75.06 | 17.06 |
| M | 350 | 71.42 | 63.99 | 13.06 | 75.02 | 15.31 |
| N | 350 | 70.71 | 64.04 | 12.94 | 79.97 | 16.16 |
| O | 350 | 70.00 | 64.03 | 12.81 | 84.97 | 16.99 |
| P | 350 | 69.28 | 64.20 | 12.71 | 90.06 | 17.83 |
| Q | 350 | 68.62 | 64.01 | 12.55 | 95.06 | 18.64 |
| R | 350 | 68.75 | 64.05 | 12.58 | 95.01 | 18.66 |
| S | 400 | 71.42 | 63.99 | 11.43 | 95.06 | 16.97 |

| SAMPLE | Sodium Meta-Bisulfite gm | Wt. % | P + SS (Wet) gm | P + SS (Dry) gm |
|---|---|---|---|---|
| E | | | 312.09 | 74.31 |
| F | | | 215.80 | 52.30 |
| G | | | 202.33 | 52.03 |
| H | | | 209.39 | 57.90 |
| I | | | 214.07 | 66.10 |
| J | | | 224.94 | 87.39 |
| K | 0.99 | 0.31 | 231.92 | 104.82 |
| L | 0.99 | 0.23 | 358.29 | 178.82 |
| M | 1.02 | 0.21 | 397.50 | 190.23 |
| N | 0.99 | 0.20 | 403.99 | 194.33 |
| O | 1.00 | 0.20 | 414.05 | 200.29 |
| P | 0.97 | 0.19 | 419.70 | 204.97 |
| Q | 0.98 | 0.19 | 565.92 | 358.30 |
| R | | | 579.33 | 364.49 |
| S | 0.99 | 0.18 | 608.15 | 367.04 |

| SAMPLE | $H_2O$, gm | P gm | pH Dry | Wt. % $H_2O$ | Wt. % Red |
|---|---|---|---|---|---|
| E | 237.78 | 13.70 | 6.55 | 79.69 | −79.69 |
| F | 163.50 | 13.66 | 5.97 | 80.88 | −80.88 |
| G | 150.30 | 13.75 | 5.29 | 79.70 | −79.70 |
| H | 151.49 | 14.12 | 3.49 | 77.58 | −77.58 |
| I | 147.97 | 14.17 | 1.03 | 74.02 | −74.02 |
| J | 139.55 | 14.27 | −0.27 | 65.29 | −65.29 |
| K | 127.10 | 13.88 | −0.52 | 58.29 | −58.29 |
| L | 179.47 | 13.78 | 2.70 | 52.09 | −52.09 |
| M | 207.27 | 13.80 | 3.18 | 54.02 | −54.02 |
| N | 209.67 | 14.18 | 3.38 | 53.79 | −53.79 |
| O | 213.76 | 14.14 | 3.99 | 53.45 | −53.45 |
| P | 214.73 | 14.05 | 4.90 | 52.93 | −52.93 |
| Q | 207.62 | 167.31 | 6.50 | 52.09 | −52.09 |
| R | 214.84 | 164.32 | 6.43 | 51.77 | −51.77 |
| S | 241.11 | 165.31 | 6.50 | 54.44 | −54.44 |

| SAMPLE | # Fecal Coliform Per 100 ml | Log [FC] | Fecal Coliform Log Reduction |
|---|---|---|---|
| E | 220,000,000 | 8.34 | |
| F | 130,000,000 | 8.11 | 1.03 |
| G | ≧1,600,000 | 6.2 | 1.35 |
| H | 1,700 | 3.23 | 2.58 |
| I | <200 | 2.3 | 3.63 |
| J | <200 | 2.3 | 3.63 |
| K | <200 | 2.3 | 3.63 |
| L | <20 | 1.3 | 6.42 |
| M | <20 | 1.3 | 6.42 |
| N | <20 | 1.3 | 6.42 |
| O | <20 | 1.3 | 6.42 |
| P | <20 | 1.3 | 6.42 |
| Q | <20 | 1.3 | 6.42 |
| R | <20 | 1.3 | 6.42 |
| S | <20 | 1.3 | 6.42 |

| SAMPLE | # Fecal Strep. per 100 ml | Log [FS] | Fecal Strep. Log Reduction | Maximum Temp. C./ Time with Temp. > 82° C. |
|---|---|---|---|---|
| E | 3,000,000 | 6.48 | | Control |
| F | 2,400,000 | 6.38 | 1.02 | 20 |
| G | ≧1,600,000 | 6.2 | 1.05 | 21.5 |
| H | 30,000 | 4.48 | 1.45 | 24 |
| I | 50,000 | 4.70 | 1.38 | 26 |
| J | <200 | 2.3 | 2.82 | 39 |
| K | <200 | 2.3 | 2.82 | 57 |
| L | <20 | 1.3 | 4.98 | 1 hr., 21 min. 95.2 |
| M | <20 | 1.3 | 4.98 | 1 hr., 3 min. 91.0 |
| N | <20 | 1.3 | 4.98 | 1 hr., 1 min. 91.0 |
| O | <20 | 1.3 | 4.98 | 1 hr., 4 min. 91.5 |
| P | <20 | 1.3 | 4.98 | 1 hr., 4 min. |

TABLE 11-continued

| | | | | |
|---|---|---|---|---|
| Q | <20 | 1.3 | 4.98 | 95.5 1 hr., 18 min. 96.6 |
| R | <20 | 1.3 | 4.98 | 1 hr., 16 min. 95.5 |
| S | <20 | 1.3 | 4.98 | 0 hr., 57 min. 89.5 |

Again acid alone (E–J) or acid and sodium meta-bisulfite did not achieve a minimum temperature of 82 degrees Celsius.

Further samples of sewage sludge were treated with sulfuric acid and meta-bisulfite or ARCO GYP. The materials were placed in an insulated reaction vessel for 30 minutes at 82 degrees Celsius. Composition of the samples U, V, W and X follow:

TABLE 12

| | SS, gm | Wt. % | 93% $H_2SO_4$ gm | Wt. % | UQFA, gm | Wt. % | $Na_2S_2O_5$, gm | Wt. % | ARCO[a] Gyp gm | Wt. % | MAX. TEMP |
|---|---|---|---|---|---|---|---|---|---|---|---|
| U | 300 | 68 | 64 | 15 | 75 | 17 | 1 | <1 | | | 96 C. |
| V | 300 | 68 | 64 | 15 | 75 | 17 | | | | | 95.5 C. |
| W | 400 | 72 | 64 | 11 | 95 | 17 | | | | | 91 C. |
| X | 300 | 68 | 64 | 15 | | | | | 75 | 17 | 67.8 C. |

[a]Note that ARCO "GYP" is by in far composed of $CaSO_3$ with very little $CaSO_4$.

TABLE 13

| | U | V | W | X |
|---|---|---|---|---|
| Dry Weight Product, g | 227.33 | 235.47 | 278.05 | 203.77 |
| pH | 2.58 | 2.50 | 3.64 | 1.00 |

Sample T was untreated. Sample T, U, V, W and X were tested for Most Probable Number (MPN) analysis results follow:

TABLE 14

UNTREATED SEWAGE SLUDGE

| SAMPLE | # Fecal Coliform Per 100 gm | LOG [FC] | # Fecal Strep Per 100 gm | LOG [FS] |
|---|---|---|---|---|
| T | 2300 | 3.36 | 140,000 | 5. |

TABLE 15

30 MINUTE TREATED SEWAGE SLUDGE

| | # Fecal Coliform Per 100 gm | LOG [FC] | Fecal Coliform Log Reduction | # Fecal Strep Per 100 gm | LOG [FS] | Fecal Strep Log Reduction |
|---|---|---|---|---|---|---|
| U | <200 | 2.30 | 1.06 | <200 | 2.30 | 2.85 |
| V | <200 | 2.30 | 1.06 | <200 | 2.30 | 2.85 |
| W | <200 | 2.30 | 1.06 | <200 | 2.30 | 2.85 |
| X | <200 | 2.30 | 1.06 | <200 | 2.30 | 2.85 |

Samples U, V, W, and X upon treatment were submitted for Most Probable Number (MPN) analysis. Sample T, untreated sewage sludge, had unusually low counts relative to previous results. However, the Log Reductions for all samples exceeded two. Note that when ARCO "GYP" was substituted for fly ash the results were identical to all others, even though the maximum temperature was only 67.8 degrees Celsius. Bear in mind, also, that all samples were allowed to remain above 82 degrees Celsius for only 30 minutes. It is believed that the success of the ARCO "GYP" is due in large part to the in situ generation of sulfur dioxide.

Experiments were conducted to determine whether thermal disinfection temperatures can be achieved by reacting dilute acid with a source of lime such as fly ash.

EXAMPLE 6

Two 50 g samples of Pyro Pacific fly ash having ΔT in 100 ml of water of 30.8 degrees Celsius (FA-1) and (FA-2) 16.8 degrees Celsius respectively were combined with sulfuric acid having concentrations from 5 to 25%. The pH and penetrometer hardness were determined. Data follows:

TABLE 16

| % $H_2SO_4$ | 5 | 10 | 15 | 20 | 25 |
|---|---|---|---|---|---|
| T Min. | 35.6 C. | 68.8 C. | 68.8 C. | 72.3 C. | 81.8 C. |
| T Maximum | 38.2 C. | 77.0 C. | 76.1 C. | 78.1 C. | 85.0 C. |
| T Min. | 31.3 C. | 55.4 C. | 69.6 C. | 72.4 C. | 80.0 C. |
| T Maximum | 35.0 C. | 65.2 C. | 75.9 C. | 78.8 C. | 85.8 C. |

The ΔT is a measure of calcium oxide content of the fly ash. A fly ash having a ΔT in water above about 15% by weight can achieve a pasteurization temperature of about 55 degrees Celsius with sulfuric acid as dilute as 10%. At 15% sulfuric acid, the suspensions of both fly ashes boiled vigorously. The pH of samples measured the next day were all basic except for the 2—2 sample which contained 25% sulfuric acid. The sulfuric acid concentration must be at least 25% if low pH products are desired. Penetrometer readings show a dramatic increase in hardness after 7 days. The product could be useful as a road base.

EXAMPLE 7

Experiments were also conducted with GWF fly ash. This fly ash (52 g) had a ΔT in 100 ml $H_2O$ of 77 degrees Celsius at 12 minutes and boiled. All contaminants with 15 to 30% $H_2SO_4$ boiled vigorously and the Penetrometer readings were higher. GWF fly ash can be combined with lower ΔT fly ashes to increase the exothermic reaction with water and sulfuric acid.

It is to be realized that only preferred embodiments of the invention have been described and that numerous substitutions, modifications and alterations are permissible without departing from the spirit and scope of the invention as defined in the following claims.

We claim:

1. A product produced by the exothermic reaction of fecal-containing solid waste with an acid-base pair, said product containing no more than 10% of its original pathogen content.

2. A product according to claim 1 in which 15% of the product comprises the residue of fecal matter.

3. A product according to claim 2 in which the reaction product contains from 1 to 30% by weight of a pozzolanic agglomerating agent.

4. A product according to claim 3 in which the agglomerating agent is the residue of fly ash.

5. A product according to claim 4 in which the agglomerated product is subdivided into particulate form.

6. A product according to claim 5 containing at least 20% by weight of calcium sulfate.

7. A product according to claim 6 in which the pH is below 7.

8. A product according to claim 7 containing at least 5% by weight of at least one of nitrogen, phosphorous or potassium.

* * * * *